United States Patent [19]

Oddenino

[11] Patent Number: 5,797,714
[45] Date of Patent: Aug. 25, 1998

[54] PLASTIC FASTENER, IN PARTICULAR, A VEHICLE PANEL FASTENER

[75] Inventor: Manrico Oddenino, Buttigliera Alta, Italy

[73] Assignee: ITW Fastex Italia S.p.A., Turin, Italy

[21] Appl. No.: 562,610

[22] Filed: Nov. 24, 1995

[30] Foreign Application Priority Data

Nov. 25, 1994 [IT] Italy ............... T094 A 000955

[51] Int. Cl.$^6$ .................................................. F16B 19/00
[52] U.S. Cl. .................... 411/508; 411/509; 411/510; 411/907; 411/913
[58] Field of Search .................... 411/508, 509, 411/510, 907, 913

[56] References Cited

U.S. PATENT DOCUMENTS

| | | | |
|---|---|---|---|
| 3,093,874 | 6/1963 | Rapata | 411/508 |
| 3,550,217 | 12/1970 | Collyer | 411/508 |
| 3,745,612 | 7/1973 | Seckerson | 24/73 |
| 4,604,776 | 8/1986 | Takahashi | 411/508 |
| 4,728,238 | 3/1988 | Chisholm et al. | |
| 4,927,306 | 5/1990 | Sato | 411/913 |

Primary Examiner—Steven N. Meyers
Assistant Examiner—Fredrick Conley
Attorney, Agent, or Firm—Schwartz & Weinrieb

[57] ABSTRACT

A plastic fastener for insertion inside a complementary opening in a part in the course of manufacture, in particular, a panel fastener for insertion inside a prismatic hole formed in a vehicle body part; the fastener compromising a head, and a shank in turn compromising elastic engaging members which snap on to respective sides of the opening and are oriented in at least one plane crosswise to the shank; the fastener being characterized in that the shank comprises an appendix projecting axially in front of the elastic engaging members with respect to the insertion direction of the fastener inside the opening; the appendix being pointed, and presenting at least one rib of a width substantially equal to the diagonal extension of the prismatic opening, and of a thickness much smaller than the width; and the rib being oriented, width-wise, in a plane forming an angle with the plane of the elastic engaging members.

14 Claims, 2 Drawing Sheets

5,797,714

PLASTIC FASTENER, IN PARTICULAR, A VEHICLE PANEL FASTENER

FIELD OF THE INVENTION

The present invention relates to a self-centering plastic fastener, and in particular to a so-called "panel fastener" for mounting vehicle finish parts, such as inner door panels, upon the vehicle body.

BACKGROUND OF THE INVENTION

For rapidly assembling vehicle finish parts, such as inner door panels, so-called "panel fasteners" are used, which (see, for example, from German Patent DE-C-3122402, substantially comprise a shank with elastic snap-on engaging means —possibly such that the force required for engagement is less than that required for release —and an appropriately shaped head designed to snap inside a seat on the inner door panel. Panel fasteners are normally preassembled to the inner door panel, and the subassembly so formed is then mounted upon or secured to the inside of the door. For rapidly assembling the inner door panel by simply pushing it onto the door, the door is provided with holes positioned to match the panel fasteners on the inner door panel, and the door is further provided with plastic bushes into which the shanks and elastic retaining means of the panel fasteners are snap fitted.

A drawback of the above system, which is still adopted, is the need for bushes to receive the shanks of the panel fasteners inside the seating holes on the door, which increases assembly cost, in addition to the cost of the bushes themselves, complicates and slows down the various stages of the assembly process, and is an added purchasing problem for the vehicle manufacturer.

On the other hand, it is not yet possible for the panel fasteners to be fitted directly inside holes formed in the door metal, in that, for construction reasons, the holes are prismatic in shape. Consequently, when mounting the inner door panel onto the door, each fastener would have to be positioned manually so as to correctly orient the snap-on engagement means, usually a number of tabs, with respect to the sides of the prismatic seating hole, the time and cost of which would obviously be prohibitive.

OBJECT OF THE INVENTION

It is an object of the present invention to provide a panel fastener of the aforementioned type, but which is capable of being oriented automatically when inserting the shank inside a prismatic seat or hole.

SUMMARY OF THE INVENTION

According to the present invention, there is provided a plastic fastener for insertion inside a complementary opening in a part in the course of manufacture, in particular, a panel fastener for insertion inside a prismatic hole in a vehicle body part, and of the type comprising a head, a shank integral with the head, and elastic engaging means on the shank and which snap onto respective sides of the opening; the elastic engaging means projecting laterally from, and in at least one direction crosswise to, the shank; and the shank comprising an end appendix projecting axially in front of the elastic engaging means in relation to the insertion direction of the fastener inside the opening; characterized in that the appendix is pointed, and comprises at least one rib of a width substantially equal to the diagonal extension of the opening, and of a thickness much smaller than the width; and the rib being oriented, width-wise, in a direction crosswise to the shank and forming an angle other than zero with the orientation direction of the elastic engaging means.

More specifically, the thickness of the rib is such that the opposite lateral sides of the rib engage a sliding manner respective diagonally-opposite angles of the opening; and the lateral sides are rounded and inclined so as to converge towards the free end of the rib to impart the pointed shape to the appendix.

As such, the part in the course of manufacture, of for example a vehicle door, need not be provided with bushes for receiving the panel fasteners; and the conventional prismatic (normally square) seating holes for the fasteners may be formed directly in the door metal, with no need for manually orienting the fasteners during assembly. By virtue of the head of the fastener being fitted idly inside the respective seat in the inner door panel, the fastener is rotated upon the inclined lateral sides of the appendix cooperating with the sides of the prismatic opening, so that the appendix is oriented diagonally and settles inside diagonally-opposite angles of the opening; and, by virtue of the appendix in turn being oriented at a given angle with respect to the elastic engaging means, the latter are automatically oriented so as to engage the sides of the opening and thereby make the fastener operative.

BRIEF DESCRIPTION OF THE DRAWINGS

A number of non-limiting embodiments of the present invention will be described by way of example within the following specification with reference being made to the accompanying drawings, in which like reference characters designate like or corresponding parts throughout the several views, and wherein.

DETAILED DESCRIPTION OF THE INVENTION

Figure 1:
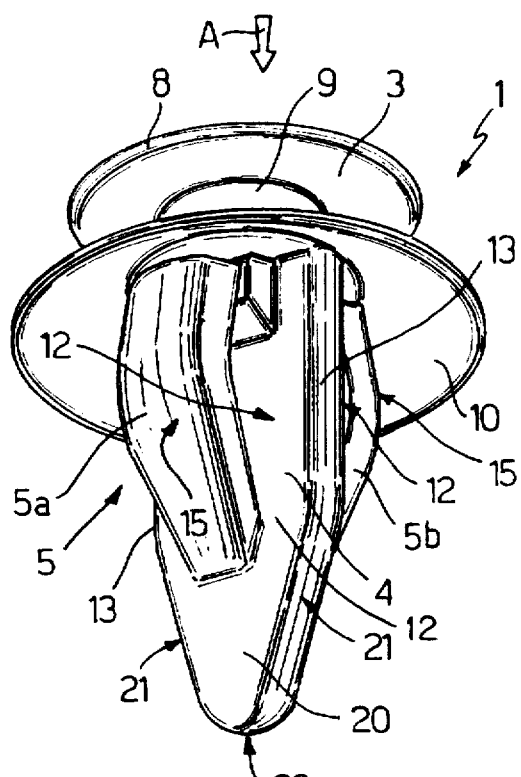
FIG. 1 is a three-quarter underside view in perspective of a fastener constructed in accordance with the present invention.
Figure 2:
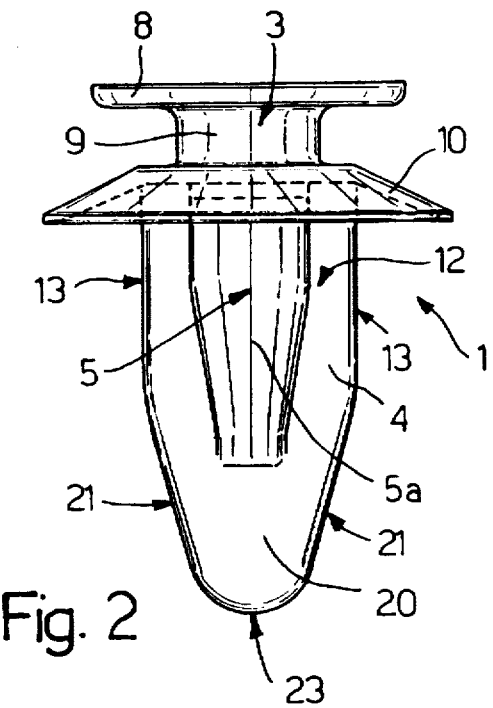
FIG. 2 is a side elevation view of the fastener of FIG. 1.
Figure 4:
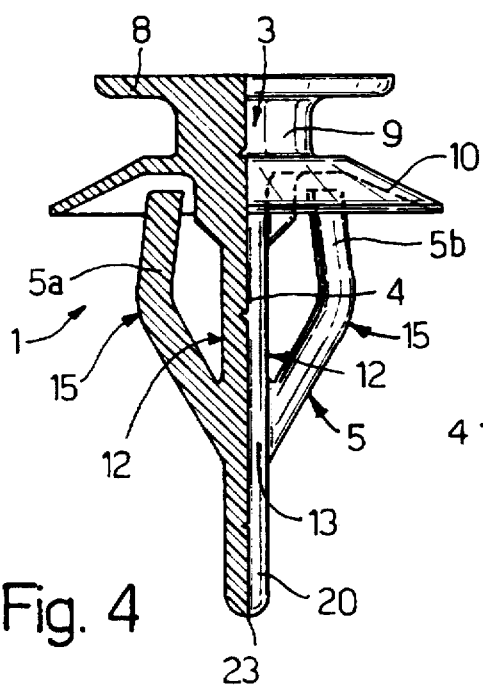
FIG. 4 is a cross-sectional view of the fastener of FIG. 3 as taken along the line 4—4 in FIG. 3.
Figure 3:
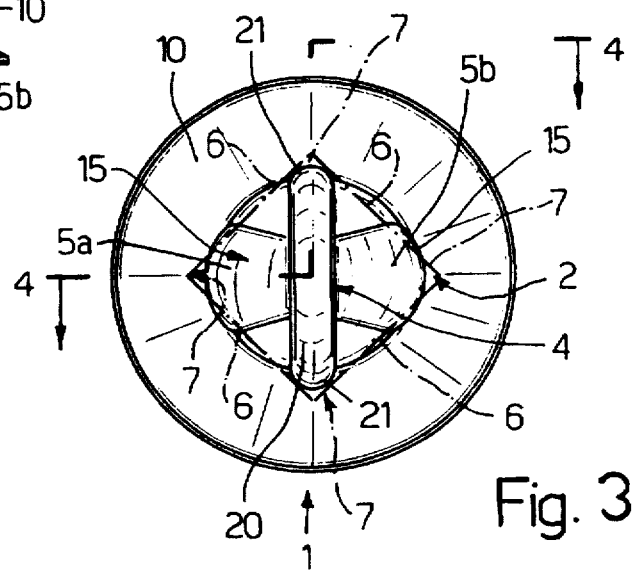
FIG. 3 is a bottom plan view of the fastener shown in FIG. 1.

Number 1 in FIGS. 1 to 4 indicates a plastic fastener for insertion inside a complementary opening 2 shown in FIG. 3 and formed within a part in the course of manufacture. More specifically, fastener 1 is a panel fastener molded in one piece from synthetic plastic material, and which is inserted inside a prismatic hole 2 formed within a vehicle body part (not shown), such as, for example on the inside, that is, facing the passenger compartment of a door , for removably providing the door with an inner door panel or other known interior finishing element.

Fastener 1 compromise a substantially known structure, and therefore comprises a substantially circular head 3; a shank 4 integral with head 3; and elastic engaging means 5 on shank 4, and which snap on to respective straight sides 6 of prismatic opening or hole 2. In the example shown, opening 2 is square, and therefore presents four sides 6 and four 90° angles 7.

Head 3 is of known shape so as to fit idly inside a respective known seat on the known inner panel or finishing element (not shown). More specifically, head 3 is mushroom-shaped, and comprises a disk-shaped connecting appendix 8, a stem 9, and an elastic, truncated-cone-shaped flange 10 with its concavity facing shank 4. Elastic engaging means 5 are also of known type, and project laterally and transversely from shank 4 in at least one direction crosswise to shank 4, that is parallel to a radial plane through the axis of shank 4.

In the embodiment shown, shank 4 is prismatic, and more specifically is defined by a having a substantially rectangular cross-sectional configuration which, in turn is defined widthwise by a pair of opposite lateral faces 12, and thicknesswise by a pair of opposite lateral edges 13 perpendicular to faces 12; where in the edges 13 and faces 12 respectively define the short and long sides of the rectangular cross section of shank 4. Elastic engaging means 5, which are of a known type, extend from faces 12 and, in the example shown, comprise a pair of opposite V-shaped tabs 5a, 5b projecting from faces 12 towards head 3, so that, in use, a barrel-shaped outer curved portion 15 of each tab 5a and 5b cooperates with a pair of adjacent sides 6 of square opening 2 as seen in FIG. 3.

According to the present invention, shank 4 also comprises an end appendix 20 projecting axially in front of that is downstream from, engaging means 5 with respect to the insertion direction, as shown by arrow A in FIG. 1, of fastener 1 inside opening 2. Appendix 20 is pointed, and comprises a rib of a maximum width which is substantially equal to either diagonal extension of opening 2 that is of a maximum width equal to the distance between two diagonally-opposite angles 7, and of a thickness which is much smaller than the width. According to the present invention, rib or appendix 20 is oriented width-wise in a direction crosswise to shank 4 and forms an angle of other than zero with the direction in which engaging means 5 project. In other words, any plane parallel to the width-wise direction of appendix 20 forms an angle of other than zero with any plane parallel to that of the left side of FIG. 4.

More specifically, the thickness of appendix 20 is such that its opposite lateral sides 21 engage in a sliding manner a pair of diagonally-opposite angles 7 of square opening 2; lateral sides 21 are rounded with a convex surface facing outwards from of shank 4, are inclined with respect to the axis shank 4, and converge at the rounded free end 23 of appendix 20 so as to form the pointed shape; and, viewed perpendicularly to faces 12, as in FIG. 2, appendix 20 is therefore substantially triangular and oriented, width-wise, parallel to faces 12.

In other words, in the embodiment of FIG. 1–4 appendix 20 comprises a triangular end continuation of shank 4, which is in the form of a single rib of a width substantially equal to the maximum width of appendix 20, that is equal to the diagonal extension of opening 2, and compromise projecting tabs 5a, 5b which are deformed perpendicularly to the width-wise extension of shank 4; and sides 21 therefore comprise continuations of lateral sides 13 as one proceeds towards tip 23.

In a actual use, head 3 is fitted in known manner inside a seat on the inner door panel; the inner door panel, complete with a number of fasteners 1 assembled idly but otherwise integral with it, is placed on the inside of the door so that each fastener 1 is positioned facing a respective opening 2 in the door, or in any other vehicle body part such as a vehicle floor; and the inner door panel is then snapped onto the door by pushing it parallel to the axis of shanks 4, that is in the direction of arrow A. Regardless of the angular position of shank 4 of fastener 1, when the above axial thrust is exerted on fastener 1, the inclined lateral sides 21 inevitably cooperate with a pair of opposite sides 6 of the opening 2, and by virtue of the inclination and the rounded convex shape of sides 21, fastener 1 is rotated about the axis of shank 4.

The above rotation therefore provides for "automatically" adjusting the angular position of appendix 20 of shank 4 of each fastener 1 with respect to respective opening 2, so that each appendix 20 settles into the FIG. 3 position in which sides 21 engage two diagonally-opposite angles 7, by virtue of the maximum distance between sides 21, that is the maximum width of appendix 20, being complementary to the size of opening 2, that is substantially equal to its diagonal extension. As such, tabs 5a, 5b, the portions 15 of which are located at 90° to sides 21, that is the same angle as angles 7, are positioned facing sides 6.

As further axial pressure is exerted, tabs 5a, 5b are flexed by sides 6 towards faces 12 that is perpendicularly to the width-wise extension of appendix 20, so as to permit portions 15 to pass and snap beneath sides 6 when tabs 5a, 5b spring back into position, thus axially locking fastener 1 inside opening 2. To remove the inner door panel, the above operations are performed in reverse. In view of the shape of tabs 5a, 5b, however, which form a sort of barb with shank 4, greater force is required for removal than for insertion.

Figure 6:
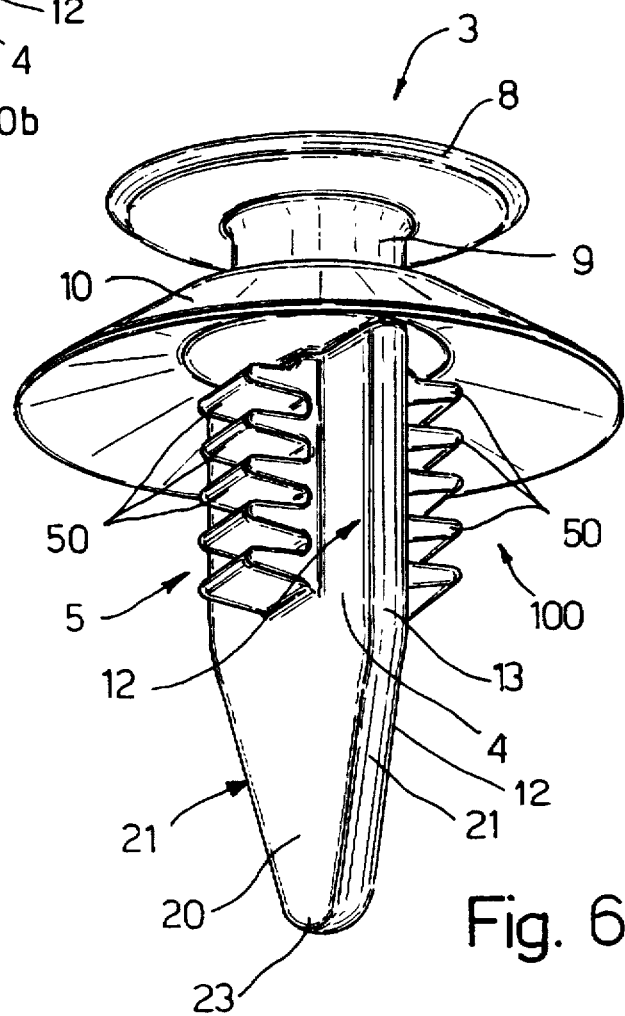

FIG. 6 shows a variation 100 of fastener 1, any parts of which similar or identical to those already described are indicated using the same numbering system. Fastener 100 is identical to fastener 1 except for engaging means 5 which, as opposed to tabs 5a, 5b, comprise two sets of known tabs 50 crosswise to and extending perpendicularly from faces 12. Fastener 100 also operates in the same way as fastener 1, except that, by featuring a number of oppositely disposed pairs of opposed tabs 50, shank 4 may be fixed in at a number of different axial positions inside opening 2.

Figure 5:
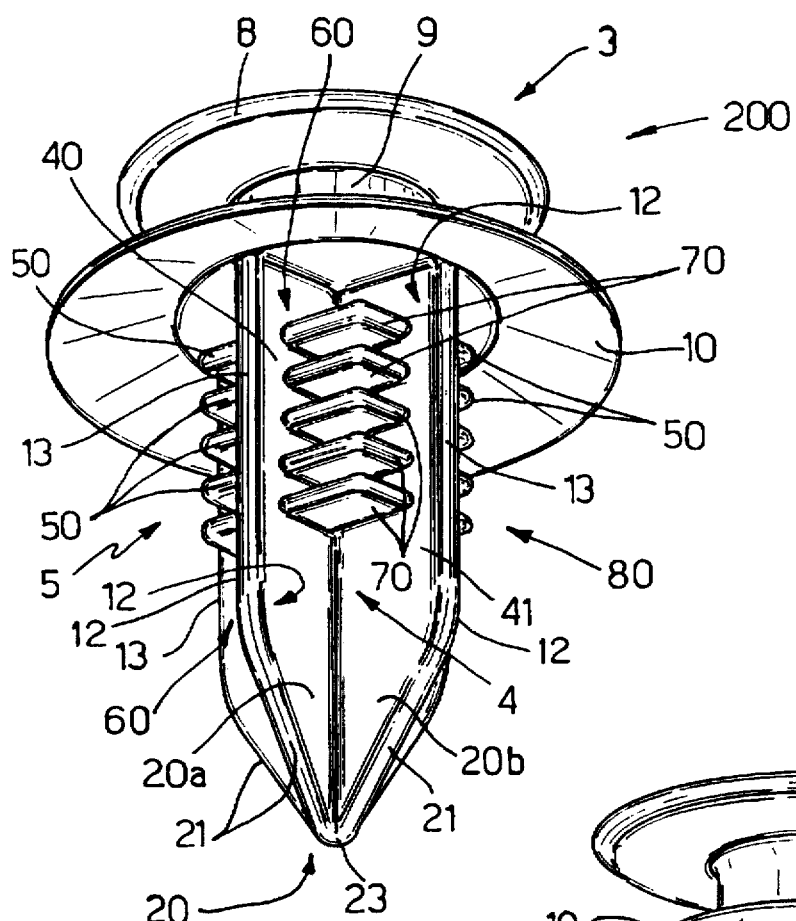
FIGS. 5 and 6 are perspective views of two possible variations of the fastener shown in FIG. 1.

FIG. 5 shows a further variation 200 of fastener 1, any parts of which are similar or identical to those already described are indicated using the same numbering system. In this case, shank 4 compromise a cross-shaped cross section, and is defined by two ribs 40, 41, each being identical to that defining shank 4 of fastener 1, and each defined by opposite faces 12 and opposite edges 13. Ribs 40 and 41 are arranged at 90° to each other and intersect along the axis of shank 4 so as to define, axially along shank 4, four recesses 60 comprising four dihedral angles defined by the faces 12 of adjacent portions of ribs 40 and 41; and appendix 20 therefore comprises two ribs 20a, 20b arranged at 90° to each other, and each defined by opposite inclined rounded sides 21 with a common end 23, so that appendix 20 is substantially pyramid-shaped.

In this case, engaging means 5 comprise respective numbers sets of known elastic tabs 50, 70 of the same type as fastener 100 in FIG. 6, and projecting transversely and laterally from shank 4 into dihedral-angle recesses 60 at a central portion 80 of shank 4; and ribs 20a, 20b defining appendix 20 therefore simply comprise a pointed end continuation of shank 4 beyond central portion 80. Fastener 200 operates in the same way as fastener 100, except that, whereas each tab 50 of fastener 100 engages two adjacent sides 6 in the same way as tabs 5a, 5b in FIG. 3, each tab 50, 70 of fastener 200 engages one side 6 of opening 2, so that all four sides 6 may be engaged simultaneously by different tabs, and tabs 50 and 70 may be formed differently, for example, as described in German Patent DE-C-3122402.

Obviously, many modifications and variations of the present invention are possible in light of the above teachings. It is therefore to be understood that within the scope of the appended claims, the present invention may be practiced otherwise than as specifically described herein.

I claim:

1. A fastener system for securing a component to a panel, comprising:

a panel having an aperture defined therein wherein said aperture has a prismatic configuration defined by sidewalls of said aperture disposed at predetermined angles with respect to each other and having a diagonal dimension defined between opposite corner junctions of pairs of said sidewalls of said aperture;

a head portion of a fastener for engaging a first surface of said panel when said fastener is inserted through said aperture defined within said panel;

a shank portion of said fastener extending away from said head portion of said fastener for insertion through said aperture defined within said panel, said shank portion comprising a rib member having a longitudinal extent, being integrally connected at a first proximal end with said head portion and having a second substantially pointed distal end for facilitating insertion of said fastener through said aperture defined within said panel, and having a substantially rectangular configuration, as viewed in horizontal cross-section and as defined by a pair of parallel faces and a pair of longitudinally inclined, rounded edges disposed upon opposite ends of and interconnecting said pair of parallel faces, defining a predetermined width dimension which is substantially equal to said diagonal dimension of said aperture as defined between first opposite corners of said sidewalls of said aperture, said rounded inclined edges of said rib member defining means for engaging sidewalls of said aperture defined within said panel and for automatically causing pivotable movement of said rib member, said shank portion, and said fastener with respect to said sidewalls of said aperture when said shank portion is inserted through said aperture of said panel so as to automatically cause said fastener to be angularly oriented with respect to said aperture defined within said panel such that said width dimension of said rib member will be aligned with said diagonal dimension of said aperture while said opposite rounded edges of said rib member will engage said first opposite corners of said aperture; and elastic snap-engaging means, mounted upon said pair of parallel faces of said rib member at longitudinal positions defined between said first and second proximal and distal ends of said rib member, having a predetermined width dimension which is substantially less than said predetermined width dimension of said rib member, and extending outwardly from central portions of said pair of parallel faces of said rib member, as viewed in said width direction, for engaging a second surface of said panel when said fastener is inserted through said aperture defined within said panel, and being disposed within a plane transverse to said width of said rib member so as to snap-engage sidewall portions of said aperture which define second opposite corners of said sidewalls of said aperture.

2. A fastener system as set forth in claim 1, wherein:
said fastener is fabricated from a plastic material.

3. A fastener system set forth in claim 1, wherein:
said plane, within which said snap-engaging means are disposed, is disposed at an angle of substantially 90° with respect to said width of said rib member.

4. A fastener system as set forth in claim 1, wherein:
said rib member has a thickness dimension which is a small fraction of said width dimension.

5. A fastener system as set forth in claim 1, wherein:
said elastic snap-engaging means are fixedly mounted at first ends thereof to said shank portion while second ends thereof freely extend toward said head portion of said fastener so as to snap-engage said second surface of said panel when said fastener is inserted through said aperture defined within said panel.

6. A fastener system as set forth in claim 1, wherein:
said snap-engaging means extend substantially perpendicular to said shank portion of said fastener and within said plane transverse to said width of said rib member.

7. A fastener system as set forth in claim 1, wherein:
said panel comprises a vehicle door panel.

8. A fastener system as set forth in claim 1, wherein:
said snap-engaging means comprises two sets of flexible tabs wherein each set of flexible tabs is disposed upon a respective one of said pair of parallel faces of said rib member, and wherein further, said flexible tabs within each set of flexible tabs are axially spaced with respect to each other along a respective one of said pair of parallel sides of said rib member so as to determine different axial positions to which said fastener can be inserted into said aperture defined within said panel.

9. A fastener system as set forth in claim 1, wherein:
said shank portion has a cross-shaped cross-sectional configuration comprising two intersecting rib members defining four dihedral regions therebetween; and
said snap engaging means project outwardly from both of said rib members so as to be disposed within said four dihedral regions.

10. A fastener system as set forth in claim 9, wherein:
said snap-engaging means extend substantially perpendicular to said rib members of said shank portion of said fastener.

11. A fastener as set forth in claim 9, wherein:
both of said rib members has a width dimension which is substantially equal to said diagonal dimension of said aperture as defined between opposite corner junctions of pairs of said sidewalls of said aperture.

12. A fastener as set forth in claim 9, wherein:
each one of said two rib members is pointed at a distal end thereof remote from said head portion of said fastener wherein said pointed ends of said two rib members meet at a common point.

13. A fastener system as set forth in claim 9, wherein:
said snap-engaging means comprises two sets of flexible tabs wherein each set of flexible tabs is disposed upon a respective one of opposite sides of each one of said two rib members, and wherein further, said flexible tabs within each set of said flexible tabs are axially spaced with respect to each other along a respective one of said sides of each one of said two rib members so as to determine different axial positions to which said fastener can be inserted into said aperture defined within said panel.

14. A fastener system as set forth in claim 13, wherein:
each one of said two sets of flexible tabs is divided in half by a respective one of said two rib members so that said two sets of flexible tabs comprise four sections of flexible tabs with one section of said flexible tabs disposed within a respective one of said four dihedral regions.

* * * * *